E. J. LOBDELL.
STEERING WHEEL.
APPLICATION FILED APR. 4, 1913.
1,146,184.
Patented July 13, 1915.
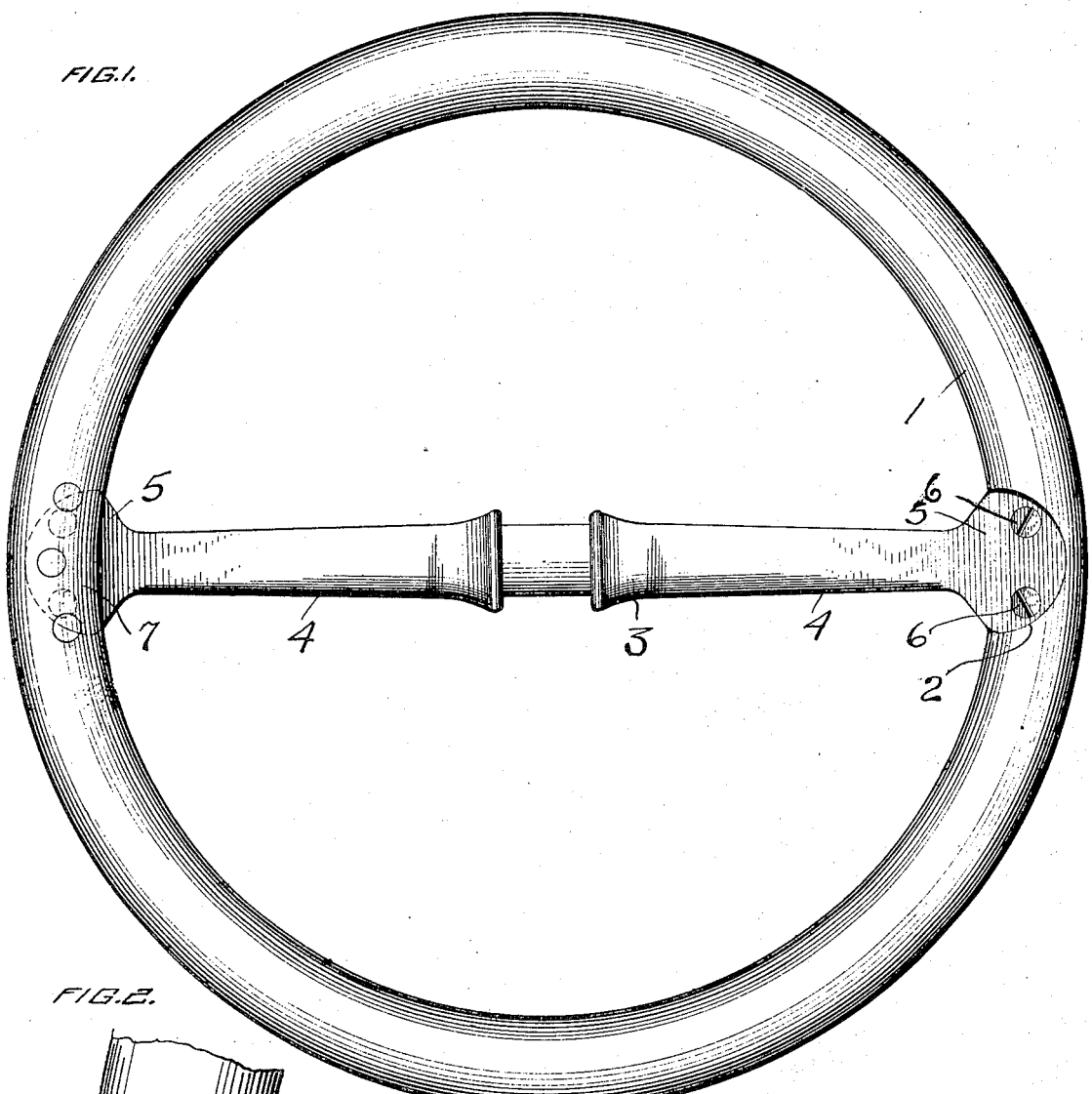
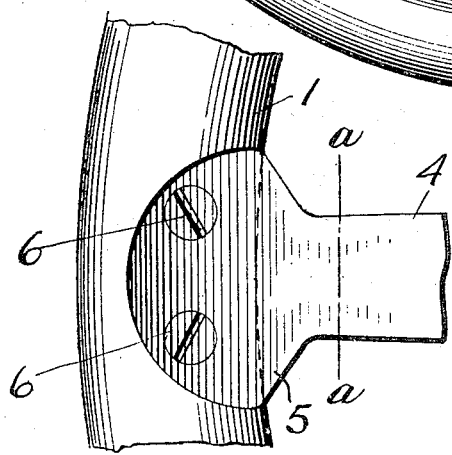
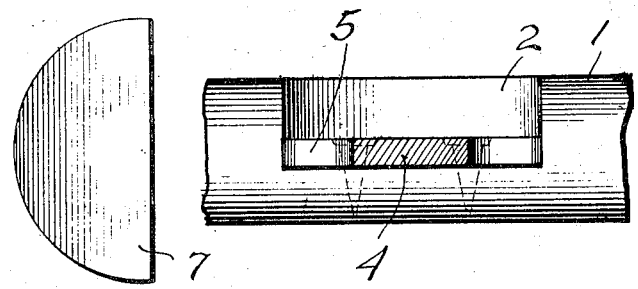
WITNESSES
INVENTOR
Edward J. Lobdell
by A. P. Greeley Attorney

UNITED STATES PATENT OFFICE.

EDWARD J. LOBDELL, OF ONAWAY, MICHIGAN.

STEERING-WHEEL.

1,146,184.     Specification of Letters Patent.     Patented July 13, 1915.

Application filed April 4, 1913. Serial No. 758,987.

*To all whom it may concern:*

Be it known that I, EDWARD J. LOBDELL, a citizen of the United States, residing at Onaway, in the county of Presque Isle, State of Michigan, have invented certain new and useful Improvements in Steering-Wheels, of which the following is a description, reference being had to the accompanying drawings, forming a part hereof.

My invention relates to wheels particularly adapted to be used as steering wheels for automobiles and other motor driven vehicles, motor driven boats and other boats in which a rim of wood or other non-metallic material is used, across which extends a spider having two or more arms connected at its center with the shaft of the steering mechanism and secured at the ends of the arms to the wheel rim and my invention has for its object to provide a connection between the ends of the wheel rim which will be strong, inexpensive and which will permit of the wheel rim being finished off smoothly so as to present no roughness to the hand of the person using it.

With these objects in view my invention consists in the construction and combination of elements hereinafter described and particularly pointed out in the claim.

Referring to the drawings, Figure 1 is a plan view of the underside of the wheel. Fig. 2 is an enlarged detail view showing the end of the spider arm secured in position. Fig. 3 is a detail view of the plug which covers the end of the spider arm. Fig. 4 is a cross sectional view on line *a—a* of Fig. 2.

In the drawings 1 indicates the rim of the wheel, here shown as of wood built up or bent to shape and finished so as to be free from roughness and be suitable to be grasped by the hand of the operator. At diametrically opposite points the rim 1 is recessed as shown at 2, the recess being cut from the underside about half through the rim.

3 indicates a spider here shown as having two arms 4, the ends of which are broadened out to fit the recesses 2 in which they are secured by screws 6 which are of such length that they do not extend through the rim. Over the ends 5 of the spider arms are secured plugs 7 which fit closely in the recesses 2 and are worked down so as to have their outer surfaces continuous with the surface of the rim 1 so that the surface of the rim is smooth.

Having thus described my invention what I claim is:

In a steering wheel for automobiles or the like, the combination of a non-metallic rim provided with semi-circular recesses formed in its under surface at opposite points in its inner periphery, said semi-circular recesses being formed with the center of the arc at the inner periphery and of less length than the width of the rim, a metallic spider having horizontally flattened ends fitting the semi-circular recesses in the rim and adapted to rest in and only partly fill the vertical depth of the recesses, screws passing through apertures in the flattened ends of the spider and entering the rim above the recesses, said flattened ends being of greater width than any other portion of the spider, and non-metallic plugs adapted to fill the unoccupied portion of the recesses and prevent accidental displacement of the screws.

This specification signed and witnessed this 13th day of March A. D. 1913.

EDWARD J. LOBDELL.

In the presence of—
    J. E. SMITH,
    G. E. TRIMM.